US006401223B1

(12) United States Patent
DePenning

(10) Patent No.: US 6,401,223 B1
(45) Date of Patent: Jun. 4, 2002

(54) PROGRAMMABLE SYSTEM FOR INVALIDATING PENDING REQUESTS WITHIN A DATA PROCESSING SYSTEM

(75) Inventor: James L. DePenning, Eagan, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/316,825

(22) Filed: May 21, 1999

(51) Int. Cl.$^7$ .................................................. G06F 11/00
(52) U.S. Cl. .................................... 714/42; 711/112
(58) Field of Search ........................... 714/42, 43, 44, 714/54, 5, 8, 13, 20, 25; 711/112, 114, 133

(56) References Cited

U.S. PATENT DOCUMENTS

| | | | | |
|---|---|---|---|---|
| 5,440,715 A | * | 8/1995 | Wyland ....................... | 395/435 |
| 5,490,250 A | * | 2/1996 | Reschke et al. ........ | 375/185.01 |
| 5,619,644 A | * | 4/1997 | Crockett et al. ........ | 395/183.21 |
| 6,058,494 A | * | 5/2000 | Gold et al. ..................... | 714/42 |
| 6,182,266 B1 | * | 1/2001 | Clutter et al. ............... | 714/807 |

* cited by examiner

Primary Examiner—Nadeem Iqbal
(74) Attorney, Agent, or Firm—Beth L. McMahon; Charles A. Johnson; Mark T. Starr

(57) ABSTRACT

A request invalidation system for invalidating pending requests within a data processing system is disclosed. According to the system of the preferred embodiment, one or more requesting units may make requests to gain access to one or more shared resources. These requests are stored in a central request storage unit and are processed according to a predetermined priority scheme. Each request includes multiple fields for storing information about the request. Within the data processing system, error indicators are provided to indicate the occurrence of a fault, and to further provide an error indication value that provides information about the nature of the fault. Ones of these error indicators are associated with a respective one of the request fields. According to the current request invalidation system, mode control logic is provided to programmably select one of the request fields as the invalidation field. If any error indicator is asserted that is associated with the selected invalidation field, the error indication value for this error indicator is compared against the invalidation field of all pending requests. In the event a predetermined relationship exists between the two compared values, the associated pending request is discarded without being presented to the requested shared resource. According to one aspect of the invention, the invalidation field is selectable by a scan-set interface that may be dynamically re-programmed during normal system operations. According to another aspect of the invention, ones of the error indicators are each associated with a respective requesting unit or a shared resource. Once an error indicator that is associated with a requesting unit or a shared resource has been asserted, no further requests for that requesting unit or shared resource will be stored within the request storage unit until a reset operation is performed. In one embodiment of the current invalidation system, the system includes logic to generate invalidation requests, which are requests to invalidate one or more pending requests based on an invalidation field and error indication value included in the request. The invalidation system further includes logic for using the invalidation field provided by an invalidation request to override the invalidation field that is programmably selected by the scan-set interface.

20 Claims, 8 Drawing Sheets

MEMORY STORAGE UNIT (MSU)

PROCESSING MODULE (POD)

|     800     |     802     |     804     |
|-------------|-------------|-------------|
| INVALIDATE REQUEST | FIELD SELECT BIT 1 | FIELD SELECT BIT 0 |

FIG. 8

| 900 | 902 |
|---|---|
| FIELD-SELECT VALUES | FIELD SELECTED |
| 0   0 | REQUESTER ID |
| 0   1 | DESTINATION ID |
| 1   0 | JOB NUMBER |
| 1   1 | JOB NUMBER |

FIG. 9

PROGRAMMABLE SYSTEM FOR INVALIDATING PENDING REQUESTS WITHIN A DATA PROCESSING SYSTEM

BACKGROUND OF THE INVENTION

1. Field of the Invention

This invention relates generally to system for invalidating requests pending to one or more system resources within a data processing system; and, more specifically, relates to a system for programmably invalidating requests stored within a queue of a data processing system using a selectable one of the requests fields to perform the invalidation.

2. Discussion of the Prior Art

In data processing systems, multiple requesting units such as instruction processors are often requesting access to one or more shared resources such as memories. To handle these requests in an orderly fashion, the requests may be temporarily stored in a storage structure and processed based on a predetermined priority scheme. By using a priority scheme that is tuned to select requests based both on the availability of the requested resources and the demand of the requesting units, system throughput may be optimized.

The use of centralized request-handling mechanism often improves system efficiency. However, this scheme may result in system bottlenecks when faults occur within one of the requesting units or shared resources. For example, a faulty requesting unit such as an instruction processor may cause a flood of spurious requests to the shared request storage logic that will fill the available storage and prevent other requesting units from entering requests. Similarly, a failing one of the shared resources such as a shared memory may become unavailable because of a fault. Because this resource is no longer processing requests, a backlog of requests to this unit may accumulate in the request storage logic such that requests to other ones of the shared resources may not be entered into the request storage logic. Thus, in a system employing a centralized request-handling scheme, a failing resource may seriously impact the ability to efficiently handle requests.

One way to handle the occurrence of faults in either the requesting or receiving units is to process any pending requests associated with the faulty units even though the processing of these requests may result in errors. This request processing is performed to clear the requests associated with the failing units from the request storage logic. Generally, this type of request processing must continue until all such requests are purged from the request storage logic, and no more additional requests are being issued. For example, requests from a failing requesting unit that have been already been entered into a centralized request storage unit may be selected for processing in the normal manner even though these requests are associated with a requesting unit that is known to be failing. These requests may be presented to, and processed by, a shared resource, with any request results being returned to the requesting unit. Since the requesting unit has failed, any returned results will be discarded. Such processing may continue until the failing unit is disabled and request initiation is discontinued.

The above-described method of request fault handling is not complex to implement since it does not involve special-case handling of erroneous requests. However, this method has several disadvantages. First, the shared resources waste processing time handling requests from the failing unit. This time could instead be spent processing legitimate requests. Moreover, system overhead is imposed in returning any associated response to the failing unit. System overhead is also imposed by any error handling that occurs because the failing unit is not able to properly receive the response. Additionally, requests from failing units may be formatted improperly, may cause errors during processing by the shared resources, or worse yet, may corrupt data associated with a shared resource. Finally, if the failing unit can not be quickly disabled, a period of time may elapse during which the other non-failing units are denied access to the shared resource because of a flood of spurious requests from the failing unit.

Similar problems exist when stored requests to a known failing resource are processed in a normal manner. For example, one way to discard the requests to failing units is to force these requests to be handled like any other request, with resulting errors being processing by the error-handling circuitry of the system. For instance, after a request is presented to a failing unit, timer circuits may be used to generate an error response if the failing unit does not respond in a predetermined amount of time. While this method of processing known erroneous requests requires a minimal amount of special-case logic to implement, it results in increased system overhead because of the error and response handling that is involved. Moreover, the handling of requests by a failing unit may result in corruption of data associated with the shared resource.

Because of the importance of maintaining data integrity, ensuring continued access to resources, and providing a resilient error-handling mechanism in data processing systems using centralized request handling mechanisms, an improved error-handling system is needed for invalidating pending requests that are associated with a known fault.

OBJECTS

The primary object of the invention is to provide an improved system for invalidating pending requests within a data processing system;

A further object of the invention is to provide a system for invalidating pending requests to access system resources based on the contents of a programmably selectable one of multiple fields included in the request;

A further object of the invention is to provide a system for invalidating pending requests to access system resources based on a requester identifier stored within a programmably selectable one of multiple fields included in the request;

Yet another object of the invention is to provide a system for invalidating pending requests to access system resources based on a resource identifier stored within a programmably selectable one of multiple fields included in the request;

A still further object of the invention is to provide a system for invalidating pending requests to access system resources based on the contents of a programmably selectable one of multiple fields included in the request, wherein the selectable one of the multiple fields is selectable using a dynamic scan-set interface;

Another object of the invention is to provide a system for invalidating pending requests to access system resources based on a job number identifier uniquely identifying one of the pending requests;

A yet further object of the invention is to provide a Content Addressable Memory (CAM) having a programmably-selectable compare field;

Another object of the invention is to provide a system for processing invalidation requests, wherein each invalidation request specifies a selectable request field and a compare value for use in invalidating pending requests;

A still further object of the invention is to provide a system for invalidating pending requests using a selectable one of multiple request fields that is selected upon the occurrence of a fault; and An additional object of the invention is to prevent further requests to be received from any requester or issued to any resource if that requester or resource has previously been associated with a reported fault.

These and other more detailed and specific objectives of the invention will become apparent from the following description of the invention.

SUMMARY OF THE INVENTION

The objectives of the present invention are achieved in a system for invalidating pending requests within a data processing system. According to the preferred embodiment, one or more requesting units make requests to gain access to one or more shared resources. These requests are stored in a central request storage unit and are processed according to a predetermined priority scheme and according to resource availability.

Each request as stored in the request storage unit includes several request fields, including fields storing the identity of the requesting unit and the identity of the requested resource. Other fields could include data for uniquely identifying a specific request, and a function field for identifying the request type.

Error indicators are provided in the current system to indicate the occurrence of a respective fault and to further provide an error indication value that provides information about the nature of the fault. Each error indicator is associated with a respective one of the request fields.

According to the current invention, mode control logic programmably selects one of the request fields as the invalidation field. If any error indicator associated with the selected invalidation field is asserted, the error indication value provided by this error indicator is compared against the invalidation field of all pending requests. In the event a predetermined relationship exists between two compared values, the associated pending request is invalidated such that the request is discarded without being presented to the requested shared resource. In the preferred embodiment of the invention, this invalidation occurs for any request for which the value stored in the invalidation field is the same as that indicated by the error indication value.

According to one aspect of the invention, the invalidation field is selectable by a scan-set interface that may be dynamically re-programmed during normal system operations. According to another aspect of the invention, ones of the error indicators are each associated with a respective requesting unit or shared resource. Once an error indicator that is associated with a requesting unit or a shared resource has been received, no further requests for that requesting unit or shared resource will be accepted or stored within the request storage unit until an operation is performed to reset the error indication logic. This prevents requests from, or to, failing units from accumulating within the request storage device, in a manner which may prevent the processing of requests from, or to, non-failing units.

In one embodiment of the current invalidation system, the system includes logic to generate invalidation requests. Like error indicators, these invalidation requests are provided to the request storage device to request the invalidation of one or more of the pending requests based on an invalidation value included in the request. Unlike the error indicators, each of these invalidation requests further includes an indicator that selects which one of the request fields is to be used as the invalidation field. The invalidation system further includes logic for using the invalidation field provided by an invalidation request to override the invalidation field that is programmably selected by the scan-set interface.

According to yet another aspect of the invention, the invalidation field is selected as being any field that is either associated with any asserted error indicator or that is indicated as being the invalidation field by a valid invalidation request. In the event multiple error indicators and/or invalidation requests are simultaneously asserted and/or issued, a predetermined priority scheme is used to determine the order in which invalidation operations will be performed.

The current invalidation system provides a mechanism for discarding pending requests that are associated with known system faults. The requests may be discarded based on a specified value stored in any selectable one of multiple request fields. By discarding pending requests in this manner, system resources are not wasted processing erroneous requests, and are therefor available for processing legitimate requests. Moreover, because requests associated with known faults are discarded without being presented to a shared resource, the integrity of any data associated with the shared resources is preserved.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

FIG. 8 is the definition for the Decoded Function field of Request Storage Device;

FIG. 9 is a table indicating the definition of the encoded Compare-Select field;

DETAILED DESCRIPTION OF THE PREFERRED EMBODIMENTS

System Platform

Figure 1:
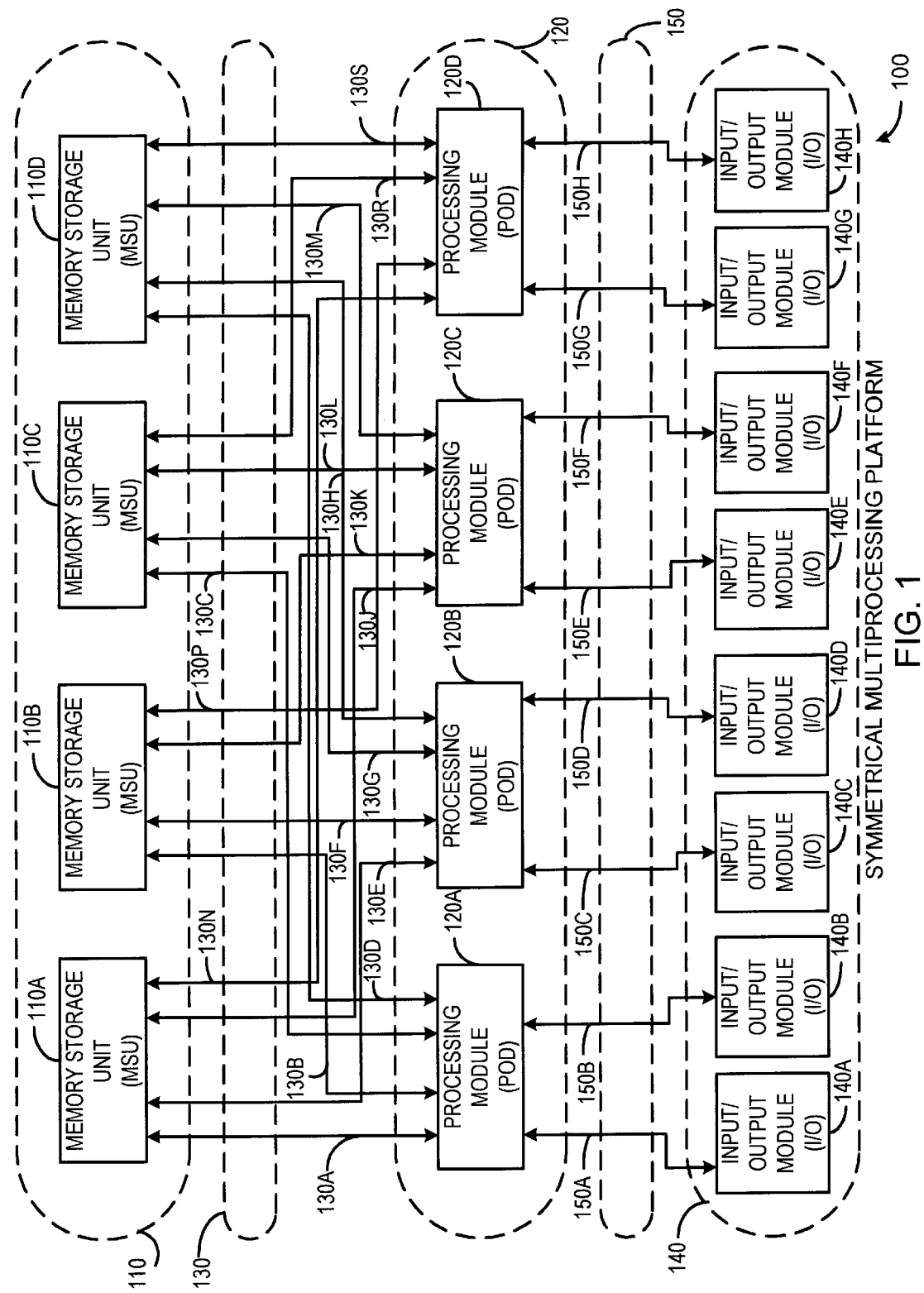
FIG. 1 is a block diagram of a Symmetrical MultiProcessor (SMP) system platform according to a preferred embodiment of the present invention.

FIG. 1 is a block diagram of a Symmetrical Multi-Processor (SMP) System Platform which includes the preferred embodiment of the present invention. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each of the PODs 120 includes one or more data processing units. Each unit in MSU 110 is interfaced to all PODs 120A, 120B, 120C, and 120D via dedicated, point-to-point connections referred to as MSU Interfaces (MIs) shown in dashed block 130, and individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on. Each MI provides the respective POD 120 direct access to data stored in the respective MSU 110.

In the preferred embodiment of the Platform 100, MI 130 comprises separate bi-directional data and bi-directional address/function interconnections, and further includes uni-directional control lines that control the operation on the data and command interconnections (not individually shown in FIG. 1). The address/function interconnections run at system clock frequency (SYSCLK) while the data bus runs source synchronous at two times the system clock frequency (2×SYSCLK). In a preferred embodiment of the present invention, the system clock frequency is 100 megahertz (MHZ).

System Platform 100 further comprises Input/Output (I/O) Modules in dashed block 140 individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A. The MIO Interfaces 150 are similar to the MI Interfaces 130, but in the preferred embodiment have a transfer rate that is approximately half the transfer rate of the MI Interfaces because the I/O Modules 140 are located at a greater distance from the PODs 120 than are the MSUs 110.

Figure 2:
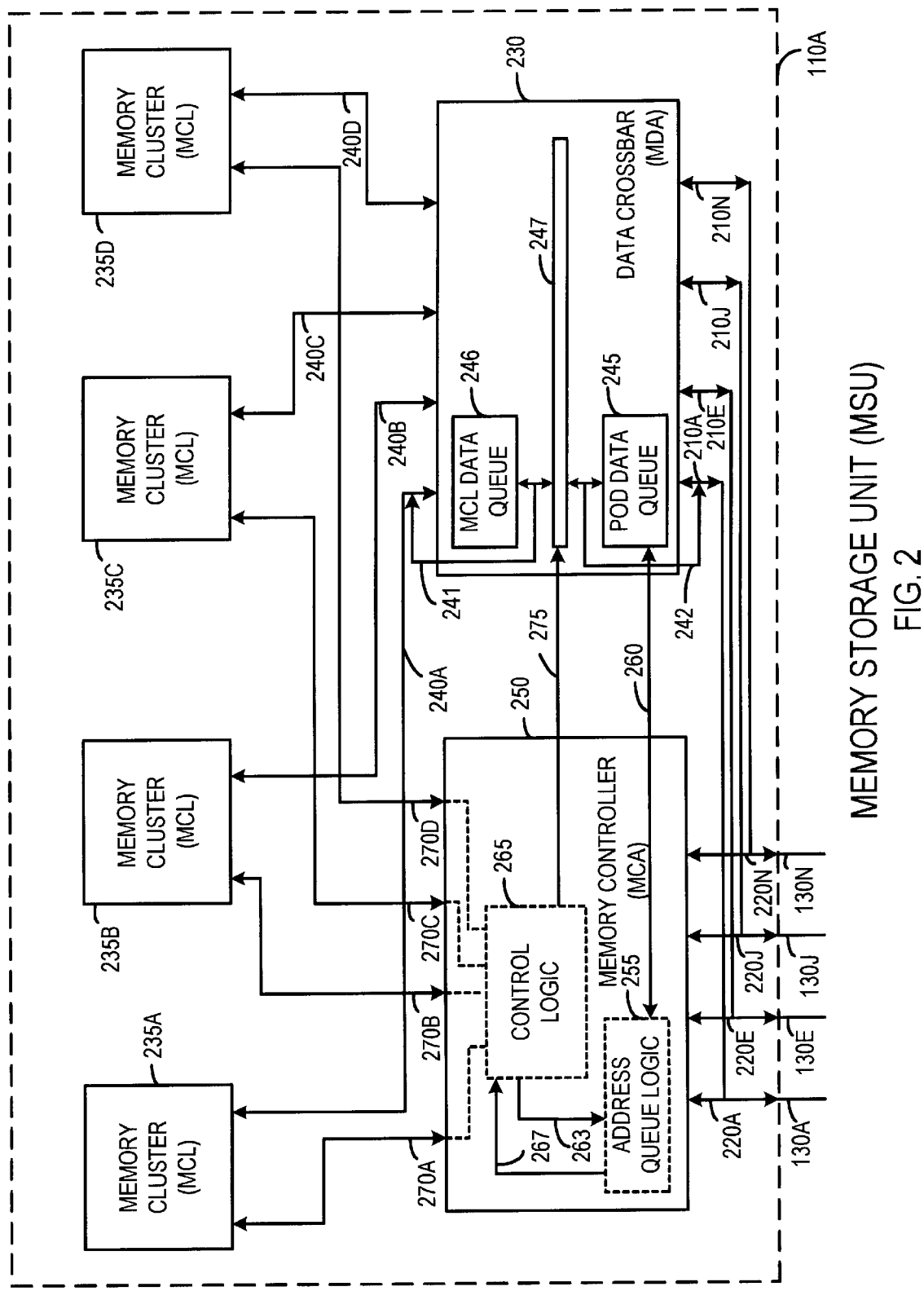
FIG. 2 is a block diagram of a Memory Storage Unit (MSU)

FIG. 2 is a block diagram of a Memory Storage Unit (MSU) 110. Although MSU 110A is shown and discussed, it is understood that this discussion applies equally to each of the MSUs 110. As discussed above, MSU 110A interfaces to each of the PODs 120A, 120B, 120C, and 120D across dedicated point-to-point MI Interfaces 130A, 130E, 130J, and 130N, respectively. Each MI Interface 130 includes two separate, independently-operative interfaces. The first interface is shown as Data Interface 210 (illustrated as 210A, 210E, 210J, and 210N). Each set of Data Interfaces 210 includes bi-directionally data bits, parity signals, and uni-directional control signals (not individually shown in FIG. 2). In addition to the Data Interfaces 210, each MI Interface 130 includes bi-directional Address/function Interfaces 220 (shown as 220A, 220E, 220J, and 220N), each of which includes address/function signals, uni-directional control signals, and a uni-directional address request (not individually shown in FIG. 2).

Data Interface 210A, 210E, 210J, and 210N interface to the Memory Data Crossbar (MDA) 230. The MDA 230 buffers data signals received on Data Interfaces 210 from the PODs 120, and provides the switching mechanism via Data Queue Interconnect Logic 247 that may route these buffered data signals to an addressed one of the storage units. The storage units, which are called Memory Clusters (MCLs) 235 (shown as 235A, 235B, 235C, and 235D), receive this data via Bi-directional Interfaces 240 (shown as 240A, 240B, 240C, and 240D). Data signals are also returned from MCLs 235 to a requesting POD 120 via Bi-directional Interfaces 240 and MDA 230. The control logic associated with this routing operation is beyond the scope of this patent.

In addition to routing data signals between various ones of the PODs 120 and ones of the MCLs 235, the MDA 230 also routes buffered ones of the data signals received from any of the PODs to any other selectable one of the PODs during POD-to-POD message transfer operations. For example, data signals received from POD 120A and buffered by MDA 230 may be routed to Data Interface 210A, 210E, 210J, or 210N for reception by POD 120A, 120B, 120C, or 120D, respectively.

The MDA buffers the data signals provided by PODs 120 via Data Interfaces 210 in POD data queue structures. A different queue structure is provided for each of the Data Interface 210A, 210E, 210J, and 210N. In FIG. 2, the POD data queue structure associated with Data Interface 210A is shown as POD Data Queue 245. Similar queue structures (not shown) exist for the other Data Interfaces 210E, 210J, and 210N. POD Data Queue 245 can be any addressable storage device capable of storing a predetermined maximum number of data signals.

The MDA also buffers the data signals provided by MCLs 235 via Data Lines 240 in MCL data queue structures. A different queue structure is provided for each of the Data Lines 240A, 240B, 240C, and 240D. In FIG. 2, the MCL data queue structure associated with Data Lines 240A is shown as MCL Data Queue 246. Similar queue structures (not shown) exist for the other Data Lines 240B, 240C, and 240D. MCL Data Queue 246 can be any addressable storage device capable of storing a predetermined maximum number of data signals.

Whereas the MDA 230 buffers data signals provided via Data Interfaces 210 and Data Lines 240, the Memory Controller (MCA) 250 buffers the address and control signals associated with POD-to-MSU requests that are provided via Address/function Interfaces 220. The MCA includes an input queue structure for each of the Address/function Interfaces 220. The input queue structure for Address/function Interface 220A is shown in FIG. 2 as Address Queue Logic 255. Similar address queue structures (not shown) are provided for each of the other Address/function Interfaces 220E, 220J, and 220N.

Address signals and associated data signals for a given POD request are stored with the respective queue structures until they are selected for processing when the requested one of the MCLs 235 becomes available to receive a request, as indicated by control signals on Lines 263. At this time, the address and control signals associated with the selected request are provided to Control Logic 265 on an interface represented by Line 267. Control Logic 265 provides arbitration and control to gate the address and appropriate read/write control to the appropriate one of the MCLs 235 across Address/Control Lines 270 (shown as 270A, 270B, 270C, and 270D) if the request involves a memory operation.

Address/Control Lines are bi-directional, and include control lines that provide Control Logic 265 information regarding error conditions. An error line (not shown individually) is included in each of the interfaces shown as Address/Control Lines 270 to indicate when uncorrectable errors are occurring in the respective MCL 235A. Each of these error lines is provided to Control Logic 265, which forwards this information to Address Queue Logic 255 as a four-bit, bit-mapped MCL Error Indication Field that is used to invalidate certain requests that are stored in Address Queue Logic 255. This will be discussed further below.

In addition to routing signals between Address Queue Logic 255 and Address Control Lines 270, Control Logic 265 further provides Control Signals 275 to Data Queue Interconnect Logic 247. Control Signals 275 provide all the data routing control to logically connect one of the POD Data Queues 245 to one of the selectable Data Lines 240 for transfers from a POD to a MCL. This is done via a selected by-pass path, which for POD Data Queue 245 is shown on Line 241. Additionally, when data is being transferred from a MCL 235 to a POD, Control Signals 275 route the data from one of the MCL Data Queues 246 to one of the Data Interfaces 210. This is done via a selected bypass path, which for MCL Data Queue 246 is shown on Line 242. Alternatively, data transfers can occur from POD Data Queue 245 to another one of the Data Interfaces 210 for POD-to-POD message transfer operations, or for other POD-to-POD operations that are beyond the scope of the current invention.

Processing Module (POD)

Figure 3:
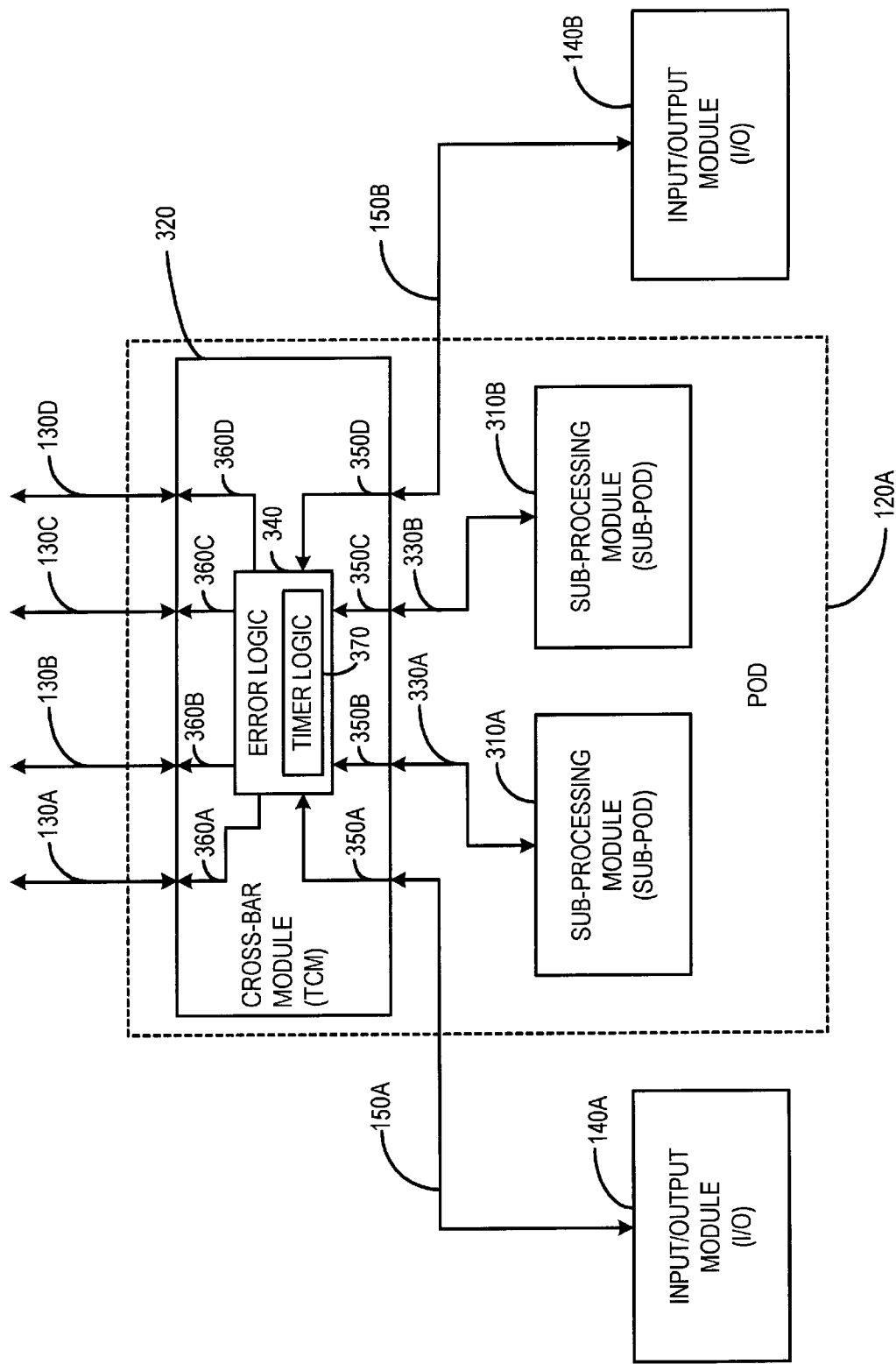
FIG. 3 is a block diagram of a processing module (POD) according to one embodiment of the present invention

FIG. 3 is a block diagram of a processing module (POD) according to one embodiment of the present invention. POD 120A is shown, but each of the PODs 120A through 120D has a similar configuration. POD 120A includes two Sub-Processing Modules (Sub-PODs) 310A and 310B. Each of the Sub-PODs 310A and 310B is interconnected to a Crossbar Module (TCM) 320 through dedicated point-to-point Interfaces 330A and 330B, respectively, that are similar to the MI interconnections 130. TCM 320 further interconnects to one or more I/O Modules 140 (shown as I/O Modules 140A and 140B) via the respective point-to-point MIO Interfaces 150 (shown as MIO Interfaces 150A and 150B). TCM 320 both buffers data and functions as a switch between Interfaces 330A, 330B, 150A, and 150B, and MI Interfaces 130A through 130D. An I/O Module 140 or a Sub-POD 310 is interconnected to one of the MSUs via the TCM 320 based on the address provided by the I/O Module or the Sub-POD, respectively. In general, the TCM maps one-fourth of the memory address space to each of the MSUs 110A through 110D.

The TCM further includes Error Logic 340 that receives an error indication from each of the interconnected Sub-PODs 310A and 310B on Interfaces 330A and 330B, respectively. According to one implementation, TCM may also receive signals from each of the interconnected I/O Modules 140A and 140B on MIO Interfaces 150A and 150B, respectively. The error indications are shown being received on Lines 350A, 350B, 350C, and 350D by Error Logic 340. In the preferred embodiment, each of these error indications are normally driven low. However, if one of the I/O Modules or Sub-PODS undergoes a failure such that the respective unit can no longer respond to communications from the TCM 320, the respective error indication is no longer driven low and is pulled high by tie-high resistors (not shown). These four error indications are provided as bit-mapped POD Error Signals on each of the MSU Interfaces 130A, 130B, 130C, and 130D to be used in request invalidation in a manner to be discussed below. This is shown by Lines 360A, 360B, 360C, and 360D, respectively.

Programmable System for Invalidating Pending Requests

Figure 4:
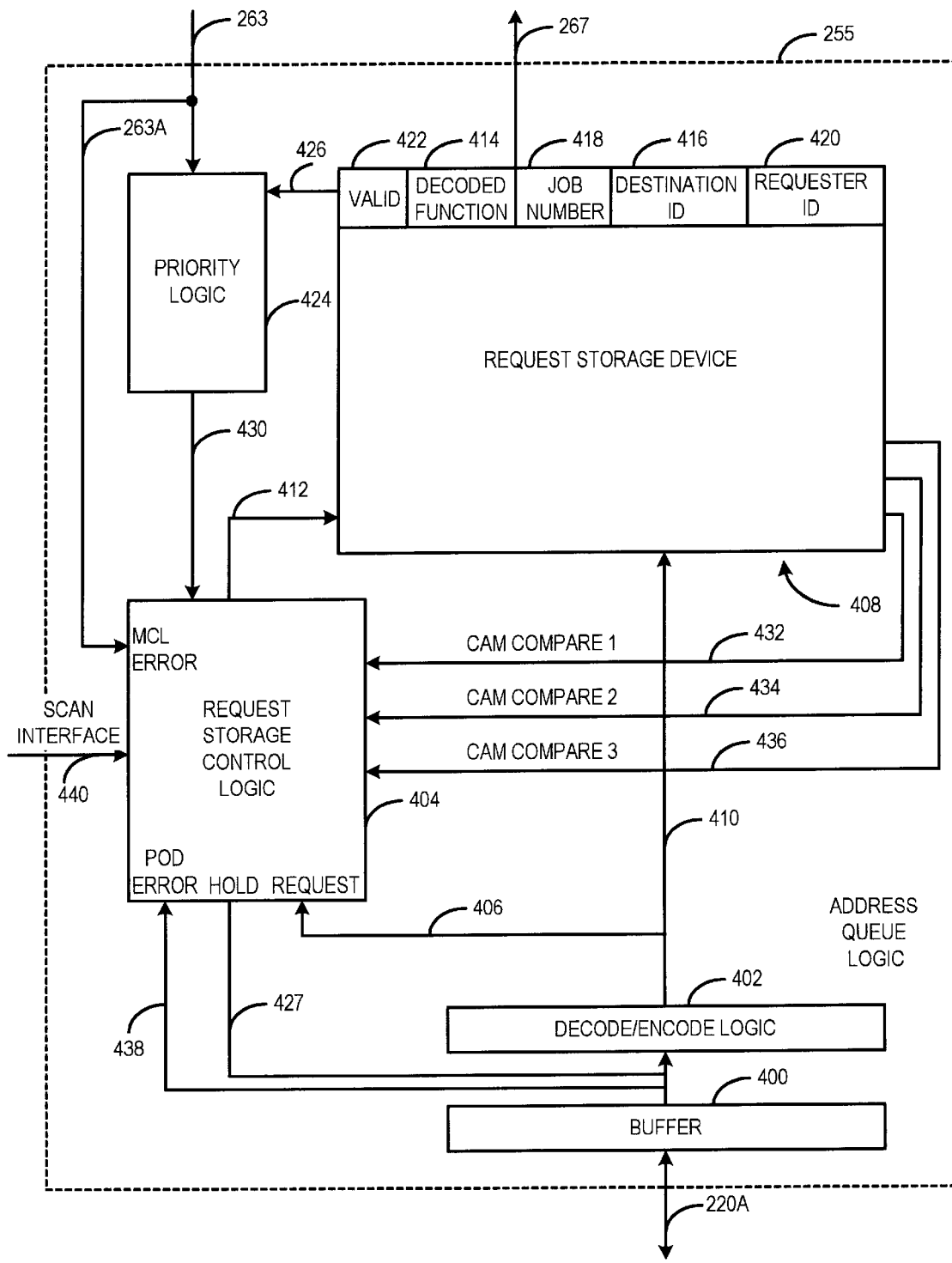
FIG. 4 is a block diagram of the Address Queue.

FIG. 4 is a block diagram of the Address Queue 255. When a request is made by POD 120A, the address/function signals and unidirectional control signals included in Address/function Interface 220A are provided to Buffer 400 for temporary storage. The buffered signals are driven by Buffer 400 to Decode/Encode Logic 402, which partially encodes the address signals, and which also decodes the function signals, as will be discussed further below. The resulting processed request signals are provided to the Request Storage Control Logic 404 on Line 406, and are also provided to the Request Storage Device 408 on Line 410. Request Storage Device 408 is a storage device that is capable of storing signals associated with a predetermined number of requests. Each addressable location stores signals associated with a respective request. In the preferred embodiment, Request Storage Device 408 has sixteen addressable locations, and is capable of storing signals associated with sixteen requests.

In FIG. 4, Request Storage Device 408 is shown as a single storage device. Physically, however, it may be implemented using multiple storage devices that are addressed in parallel when a request is either read from, or written to the Request Storage Device. This will be discussed below.

Request Storage Control Logic 404 selects an available location within Request Storage Device 408 to store the processed request signals. Request Storage Control Logic 404 provides address and control signals on Lines 412 to store the processed request signals at the selected address within Request Storage Device 408. In the preferred embodiment, the stored information for each request includes decoded function signals shown stored in Decoded Function Field 414. The decoded function signals indicate the type of operation being requested. In one embodiment, the types of requested operations include memory read and write operations. According to another embodiment, the Request Storage Device may further contain POD-to-POD message operations for sending message data from one POD 120 to another POD. During these types of message operations, the message data is received on one of the MSU Interfaces 130, routed through an MSU 110 to another MSU Interface 130, and is provided to a receiving POD 120.

Request Storage Device 408 further includes Field 416 for storing signals indicating for memory operations which of the MCLs, 235A, 235B, 235C, or 235D, is the receiving unit, or target, for the request.

Request Storage Device 408 also stores a job number in Field 418. The job number is an encoded field provided on the bi-directional address/function interconnections of each MSU Interface 130 that indicates a unique request. Any response associated with a request is returned to the requester with this job number so that the requester may match the original request with the response. This is necessary since in the system of the preferred embodiment, responses are not guaranteed to be returned to the requester in the order the requests are issued.

Additionally, each addressable location in Request Storage Device further stores a requester ID in Field 420, which in one embodiment is a bit-mapped field identifying the unit making the request. According to one embodiment of the invention, Field 420 will identify either one of the Sub-PODs 310A or 310B, or one of the I/O Modules 140A or 140B. Finally, Request Storage Device also includes a valid indicator in Field 422 that indicates that the associated address within Request Storage Device 408 is storing a valid request.

Requests are processed in a predetermined order as determined by Priority Logic 424. The priority scheme used by Priority Logic 424 utilizes the decoded function signals associated with each of the valid requests to schedule the processing of requests based on the type of request. The priority scheme further schedules memory requests based on the availability of the requested memory resource as is signaled by Control Lines 263, which are generated by Control Logic 265 in response to acknowledge signals provided by MCLs 235. The signals associated with each of the valid requests are provided to Priority Logic 424 on the interface shown as Line 426. When Priority Logic 424 selects a request for processing, Priority Logic provides request selection signals on Line 430 to Request Storage Control Logic 404, which in turn, generates address and control signals on Lines 412 to Request Storage Device 408. This results in the selected request being read from Request Storage Device 408 onto the interface shown as Line 267, and is thereafter provided to Control Logic 265, which forwards the request to the appropriate MCL 235 for servicing. The priority scheme, which is designed to optimize memory utilization and system performance, is largely beyond the scope of the current invention.

Request Storage Control Logic 404 sends a Hold Signal 427 to POD 120A to indicate when Request Storage Device 408 has stored a predetermined number of requests. The Hold Signal indicates that POD 120A should discontinue sending requests until requests are removed from Request Storage Device 408 as communicated to the POD by the de-assertion of the Hold Signal.

Request Storage Control Logic 404 receives signals that are needed to invalidate requests within Request Storage Device 408. These signals include multiple groups of CAM Compare Signals shown as CAM Compare 1 432, CAM Compare 2 434, and CAM Compare 3 436. Each of these groups contains N signals, wherein N is the number of requests that may be stored in Request Storage Device. Request Storage Control Logic 404 also receives the bit-mapped POD Error Signals provided by TCM 320 on the MSU Interface 130A as discussed above, and further receives the MCL Error Signals on Lines 263A. Finally, Request Storage Device is interconnected to a Scan Interface 440 for use in allowing a maintenance processor to perform serial reading and writing (scanning) of one or more storage devices (not shown in FIG. 4) included in Request Storage Device. The use of these signals in performing request invalidation is discussed in detail below.

Figure 5:
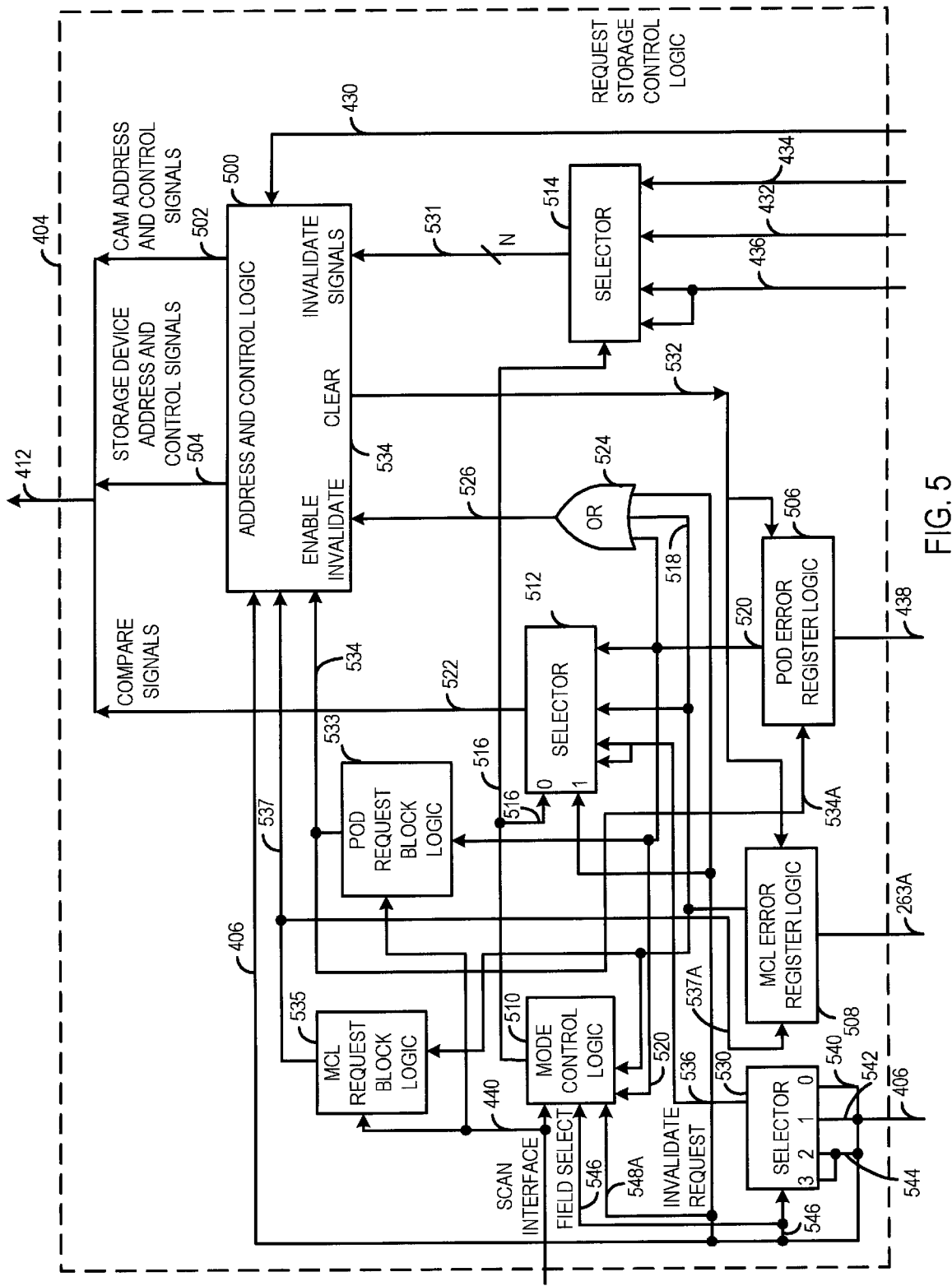
FIG. 5 is a block diagram of Request Storage Control Logic.

FIG. 5 is a block diagram of Request Storage Control Logic 404. During normal (non-invalidate) situations when a request is being stored in Request Storage Device 408, valid request signals are received by Address and Control Logic 500 on Lines 406. In response, and in a manner beyond the scope of this invention, Address and Control Logic 500 generates address and control signals on Lines 412 that are used to write the request to an available addressable location within Request Storage Device 408.

As discussed above, Request Storage Device may be thought of logically as a single storage device, but in fact, is implemented using multiple storage devices that may be written in parallel to each store a respective portion of the request. Ones of the multiple storage devices are accessed using CAM address and control signals on Lines 502, whereas one or more other ones of the storage devices are written using the Storage Device Address and Control Signals on Lines 504 as will be discussed further below.

During normal (non-invalidate) situations, requests are read from Request Storage Device 408 when Priority Logic 424 provides address and control signals on Lines 430 to select one of the requests. This causes Address and Control Logic 500 to generate read control and address signals on Lines 502 and 504, which are provided to Request Storage Device 408 on Line 412 to read the selected request from the Request Storage Device.

Request Invalidation

Sometimes it is desirable to invalidate requests that are stored in the Request Storage Device so that those requests are not processed. This occurs, for example, if the requesting unit or destination unit fails. Although in these situations, the request could be allowed to be processed in the normal manner, this may create unnecessary overhead because of resulting error processing, will waste system resources, and may result in corruption of some data associated with the requested resources. For example, if a Sub-POD 310A fails, the pending requests for the failing unit may be passed to memory and processed in the normal manner such that an acknowledge is returned to this Sub-POD. However, this wastes memory, interface, and other queuing resources processing a request that is no longer meaningful and will ultimately be discarded. Moreover, the Sub-POD will not respond to the returned request acknowledge, causing additional error indications that must be handled. Additionally, any data associated with the request may be corrupted and may corrupt data stored in the requested MCL 235.

A similar situation occurs if one of the MCLs 235 begins experiencing multiple uncorrectable errors. Pending requests to the MCL that are already queued within Request Storage Device may be passed to the MCL to generate additional errors. However, the resulting error processing is time-consuming, and creates unnecessary system overhead.

To avoid processing overhead and the generation of additional error indications, it is preferable to remove requests from the Request Storage Device immediately upon receipt of a fault indication. To do this, the POD Error Signals provided on MSU Interface 130, and the MCL Error Signals provided to Request Storage Control Logic on Line 263 are employed. Request Storage Control Logic 404 receives these signals on Lines 438 and 263A, respectively. POD Error Signals are latched in POD Error Register Logic 506, and MCL Error Signals are latched in MCL Error Register Logic 508. One set of these latched signals is selected for use in performing the invalidation.

The invalidation signal selection is performed by Mode Control Logic 510, which provides selection signals to Selectors 512 and 514 on Lines 516. Mode Control Logic includes a serial scan register that may be set to a predetermined value using Scan Interface 440 as is known in the art. Scan Interface 440 is a dynamic scan interface that can be used to initialize Mode Control Logic during system initialization, and may further be used to change the setting of Mode Control Logic during normal system operations. This allows invalidation operations to be selectably performed using either the Latched MCL Error Signals on Lines 518, or the Latched POD Error Signals on Lines 520.

According to one embodiment of the invention, Mode Control Logic 510 provides selection signals to Selector 512 to select between the signals on Lines 518 or the signals on Lines 520. The selected signals are provided on Lines 522 as Compare Signals, are concatenated with the address and control signals on Lines 502 and 504, and are provided to Request Storage Device 408 to be used in a manner to be discussed below.

As discussed above, the POD Error Signals on Lines 438 and the MCL Error Signals on Lines 263A are master-bitted fields that each includes four signals. In the preferred embodiment, all signals are driven low if no failure is occurring. If a failure occurs, the signal line associated with the failing unit are pulled to a high logic level. The latched error signal, which is provided on either Line 518 if the failure is associated with a MCL 235, or which is provided on Line 520 if the failure is associated with a POD subunit, will be detected by OR Circuit 524, which will generate an Enable Invalidate Signal on Line 526 to Address and Control Logic 500. In response to the Enable Invalidate Signal 526, Address and Control Logic 500 generates CAM Address and Control Signals on Lines 502. These CAM Address and Control Signals are provided to Request Storage Device to cause the Compare Signals on Lines 522 to be compared to the value stored in every entry of every CAM in Request Storage Device. This comparison function is discussed by considering the circuit of FIG. 6.

Figure 6:
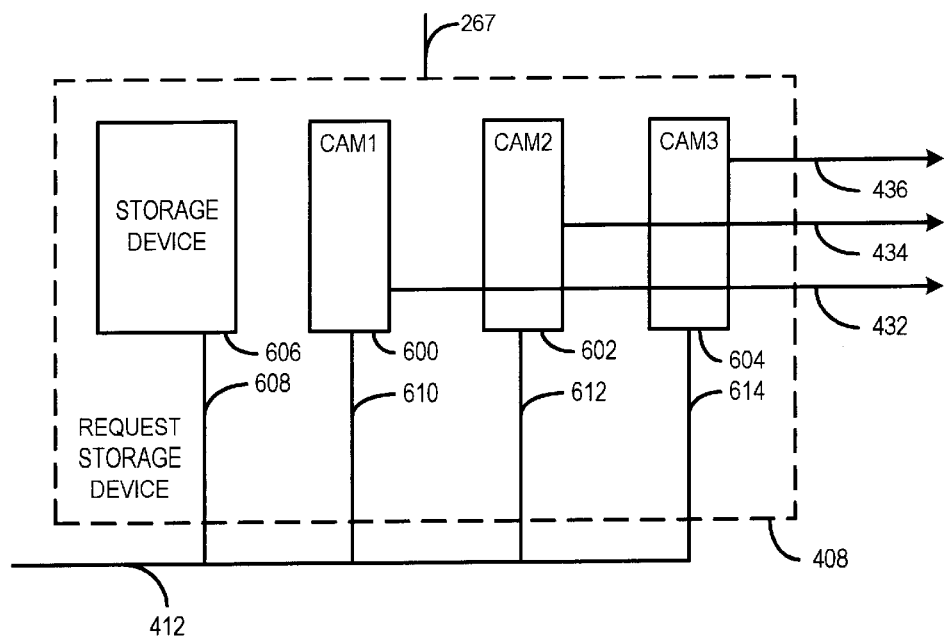
FIG. 6 is a block diagram of Request Storage Device.

FIG. 6 is a block diagram of Request Storage Device. As discussed above, Request Storage Device 408 may be logically considered as a single storage device, but is, in fact, implemented using multiple storage devices that include several Content Addressable Memories (CAMs). At least two CAMs are used in the present invention, but more may be included. FIG. 6 shows the use of three CAMs, CAM1 600, CAM2 602, and CAM3 604. Each of the CAMs includes at least N addressable storage locations, wherein N is the number of requests that can be stored in Request Storage Device 408. Each of the CAMs is used to implement a predetermined field of Request Storage Device 408. For example, CAM1 may implement Destination ID Field 416 of Request Storage Device by providing the capability to store N Destination IDs, one for each of the requests that may be stored in Request Storage Device 408. Certain ones of the fields contained in Request Storage Device 408 may, but need not necessarily, be stored in a CAM such as Valid Indicator in Field 422. These fields can be stored in any storage device, such as a Random Access Memory, a bank of registers, etc. This storage device is shown as Storage Device 606.

Address, control, and compare signals are collectively provided to Request Storage Device 408 on Line 412. Storage Device 606 receives the Storage Device Address and Control Signals shown on Line 504 of FIG. 5. These are shown being received on Line 608 of FIG. 6. Each of the CAMs, shown as CAM1 600, CAM2 602, and CAM3 604 receive the Compare Signals and the CAM Address and Control Signals shown provided on Lines 522 and 502, respectively, of FIG. 5. All of these signals are provided to each of the CAMs on Lines 610, 612, and 614 of FIG. 6.

During a compare operation, each of the CAMs will generate a bit-mapped group of N signals on a respective set of CAM Compare Lines, where N is the number of requests that may be stored in Request Storage Device 408. These compare lines are shown as CAM Compare 1 Signals 432, CAM Compare 2 Signals 434, and CAM Compare 3 Signals 436.

Figure 7:
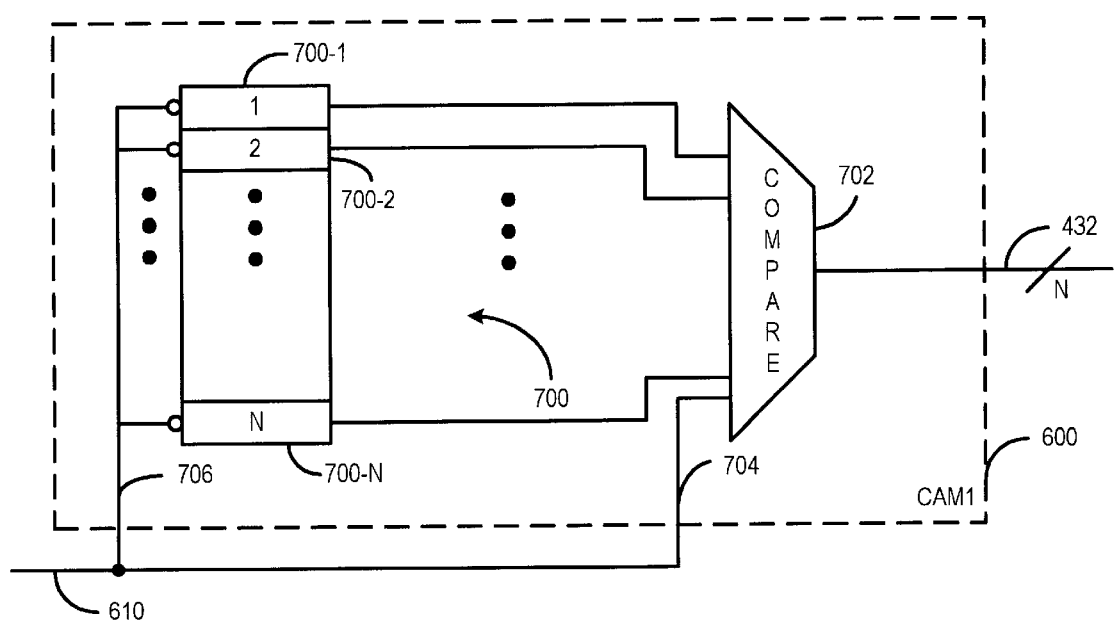
FIG. 7 is a block diagram of CAM1.

FIG. 7 is a block diagram of CAM1 600. Although CAM1 is shown and described, it will be understood that the following discussion applies equally to CAM2 602, CAM3 604, and any other CAMs that may be included in any embodiment of the current invention. CAM1 includes a Bank 700 of at least N individually-addressable storage devices shown as Storage Device 700-1, 700-2, through 700-N wherein each of these devices may be registers, latches, or the like. These storage devices are addressed using CAM Address and Control Signals shown on Lines 502 of FIG. 5. Each storage device may be address singularly, as is done when a request is written to, or read from, an addressed one of the addressable locations in Request Storage Device 408. Each storage device in CAM1 600 may also be addressed in parallel, as is done when a parallel compare operation is performed.

During a parallel compare operation, the Compare Signals shown on Lines 522 of FIG. 5 are provided to Compare Circuit 702 on Line 704. Address and Control Logic 500 generates CAM Address and Control Signals on Line 502, which are provided on Line 610 to Line 706 for reading, in parallel, each of the storage devices 700-1 through 700-N. As discussed above, these storage devices are collectively used to implement a selected field of the Request Storage Device 408 such as the Destination ID Field. For example storage device 700-1 may store the Destination ID for a valid request stored in the first addressable location of Request Storage Device 408, storage device 700-2 may store the Destination ID for the request stored in the second addressable location, and etc.

Data read in parallel from each of the storage devices 700-1 through 700-N is provided to Compare Circuit 702 for comparison against Compare Signals provided on Line 704. For any data that matches the Compare Signals, a master-bitted group of N CAM Compare 1 Signals is generated on Line 432. This signal group identifies the storage devices 700-1 through 700-N that store data having a predetermined relationship to the Compare Signals on Line 704. In the preferred embodiment, a match is detected when the Compare Signals are the same as the stored data. A match may occur on data stored in one, more than one, or none of the storage devices. It may further be noted that these storage devices may or may not be part of a valid entry in Request Storage Device 408. CAM Compare 1 Signals are provided to Selector 514 on Line 432, and may further be provided to Address and Control Logic 500 on Lines 531 to perform an invalidate operation.

The above-described embodiment of the invention is best described by example. Assume that Mode Control Logic 510 is scanned at system initialization time in a manner known in the art such that any request invalidation is to be performed using the POD Error Signals. Further assume that Sub-POD 310A fails such that one of the error signals included in the master-bitted POD Error Signals is driven high-active and latched in POD Error Register Logic 506. The latched value identifies Sub-POD 310A as the failing unit. Furthermore, Selector 512 is conditioned by Mode Control Logic 510 to select the Latched POD Error Signals on Lines 520, which is provided to Request Storage Device on Line 412.

The high-active generation of the POD Error Signal is detected by OR Circuit 524, which provides an Enable Invalidate Signal on Line 526 to Address and Control Logic 500. This results in Address and Control Logic 500 generating CAM Address and Control Signals on Line 502 which are provided to each of the CAMs included in Request Storage Device to cause parallel compare operations to occur within each of the CAMs.

Assume for the current example that only two CAMs are used to implement the Request Storage Device, with CAM1 storing the Destination ID Field 416 and CAM2 storing the Requester ID 420. The POD Error Signals are compared, in parallel, to each of the entries in CAM1 and CAM2, and CAM Compare 1 and CAM Compare 2 Signals are provided on Lines 432 and 434, respectively, to Selector 514. Mode Control Logic 510 conditions Selector 514 to provide the signals on Line 434 from CAM2 602 to Address and Control Logic 500 on Line 531.

The Requester ID Field 420 is a master-bitted field that is defined to match a respective POD Error Signal when only a single sub-unit in a POD 120A is failing. For example, Sub-POD 310A may have a binary requester ID of "0001", which is also the value which is provided on master-bitted POD Error Signal Lines if Sub-POD 310A fails. Thus, the CAM Compare 2 Signals indicate which entries in Request Storage Device 408 are associated with the failing device. A similar scheme is used for the MCL Error Signals and the Destination ID Field 416. It may be noted that a compare operation can only be performed when a single bit is set in either the MCL Error Register Logic 508, or the POD Error Register Logic 506. Thus each of these registers is associated with logic that allows only a single fault to be stored in the register at once.

Returning to the current example, assume that CAM Compare 2 Signals provided on Line 531 to Address and Control Logic indicate that the first and third addressable locations within Request Storage Device store requests associated with the failing unit, which is Sub-POD 310A. Address and Control Logic 500 will generate the Storage Device and Control Signals 504 to write to Request Storage Device 408 to clear the Valid bit for the first and third entries, thereby invalidating these requests, effectively removing them from the queue. This invalidation process may be performed in parallel for the first and third entries if Storage Device 606 is implemented using individually-addressable registers, as is known in the art. Alternatively, the invalidation process may be performed sequentially, as will be necessary if Storage Device 606 is implemented using a Random Access Memory.

After the invalidation of the matched entries is complete, sequence control within Address and Control Logic 500 generates a clear signal on Line 532 to clear the latched error bit in POD Error Register Logic 506 such that the Enable Invalidate Signal is deactivated and the Invalidate Cycle is considered complete. Although this bit is cleared in POD Error Register Logic 506, a copy of this bit is saved in POD Request Block Logic 533. POD Request Block Logic 533 records the occurrence of any error occurring for any POD sub-unit. This information is provided on Line 534 to Address and Control Logic 500, and is used by Address and Control Logic 500 to prevent a POD sub-unit that has previously indicated an error condition from entering a request in Request Storage Device 408. This prevents a failing sub-unit or interface from erroneously initiating a request to memory. Similarly, MCL Request Block Logic 535 records the occurrence of any error occurring for any MCL, and provides this information to Address and Control Logic 500 on Line 537. Address and Control Logic 500 uses this information to prevent any request to a failing MCL from entering Request Storage Device 408. Both POD Request Block Logic 533 and MCL Request Block Logic 535 are cleared via Scan Interface 440 after a failure condition has been corrected. The contents of POD Request Block Logic 533 and MCL Request Block Logic 535 are also provided to POD Error Register Logic 506 and MCL Error Register Logic 508, respectively, on Lines shown as 534A and 537A, respectively. This prevents the re-latching of a fault that has already been received once.

The above example describes the use of POD Error Signals in performing a request invalidation operation. A similar invalidation cycle may be performed on the Destination ID Field 416 using the MCL Error Signals. In this case, Mode Control Logic 510 is programmed to condition Selector 512 to select the stored contents of MCL Error Register Logic 508, and to further condition Selector 514 to select the CAM Compare 1 Signals.

According to another embodiment of the invention, the invalidation of requests stored in Request Storage Device 408 may be initiated by Timer Logic 370 in TCM 320. Timer Logic in the TCM 320 times requests to ensure that the request acknowledge is received for each request before a predetermined period of time has elapsed. If this does not occur, a request is initiated by the TCM that has similar fields as any other request, including a function code field, a job number, a destination ID, and a requester ID. These fields are as shown in FIG. 4 for requests stored within Request Storage Device 408. For the TCM-generated request, the request function field indicates that the request is an invalidate request, and further indicates which other field of the request is to be used for the compare value. This request is provided from TCM 320 on MSU Interface 130A to Address Queue Logic, where it is provided to Request Storage Control Logic on Lines 406.

FIG. 8 is the definition for the Decoded Function field as would be stored in Field 414 of Request Storage Device, and as is provided by Decode/Encode Logic 402 to Request Storage Control Logic 404 on Line 406. One bit in this field, shown as bit 800, indicates the request is an invalidate request. Two other bits of the function field, shown as bits 802 and 804, are an encoded field that point to another one of the fields within the request, wherein the field pointed to is to be used as the compare field for performing the invalidate operation associated with the invalidation request.

FIG. 9 is a table indicating the definition of the encoded Field-Select field that serves as a pointer to the request field selected for the compare. The two-bit encoded value shown in Column 900 indicates the possible bit settings for Bits 802 and 804 of FIG. 8. Column 902 of this table correlates the encoded bit settings with a selected field within the request that is to be used as the compare value to perform the invalidation operation. For example, when Bits 802 and 804 are set to the value "00", the Requester ID Field as would be stored in Field 420 of Request Storage Device 402 is used as the compare value for the invalidation operation. When Bits 802 and 804 are set to value "01", the Destination ID Field 416 is selected, and when these bits are set to either values "10" or "11", the Job Number Field 418 is selected for the compare value. As mentioned above, the Job Number Field stores an identifier that uniquely identifies a request. This is the field that in the preferred embodiment is used by TCM 320 to generate invalidation requests. The use of these bits can be further understood by returning to FIG. 5.

Assume that more than the allotted time has expired for a particular request having a job number of "0001". This could occur for any number of reasons, including a back-up of requests to the destination unit that resulted in the request not being serviced in a timely manner. It may be desirable to remove this request from the Request Storage Device 408 and re-issue it at a later time. To this end, TCM 320 issues a request with the function field indicating that the request is an invalidate request, and further indicating that the invalidation operation will use Field 418 of the request as the compare. Field 418 is set to "0001" to indicate that the request having this job number should be invalidated.

FIG. 5 shows Selector 530 receiving as inputs various ones of the fields from the issued request as provided on Lines 406. Requester ID Field 420 is provided on Line 540, Destination ID Field 416 is provided on Line 542, and the Job Number Field is provided on Line 544. Field Select Bits 802 and 804 are provided to Selector 530 on Line 546 to gate one of the input fields of Selector 530 onto Line 536 for possible use as Compare Signals 522. The Invalidate Request signal 800, which indicates that the current request is an invalidate request, is routed on Line 548 to Selector 512 and to OR Circuit 524. When high-active, this signal causes Selector 512 to select the signals on Line 536 for use as Compare Signals 522 in performing the CAM compare operation in the manner discussed above. This further causes OR Circuit 524 to generate the Enable Invalidate Signal 526. This signal is also routed on Line 548A to Mode Control Logic 510 for use in a manner to be discussed below.

In the case of an invalidation request generated by TCM 320, the signals to be selected by Selector 514 for use in performing the invalidate request are selected by Field Selection Bits 802 and 804 instead of by the contents of a Scannable Register included in Mode Control Logic 510. The manner in which this is accomplished is discussed further below.

Figure 10:
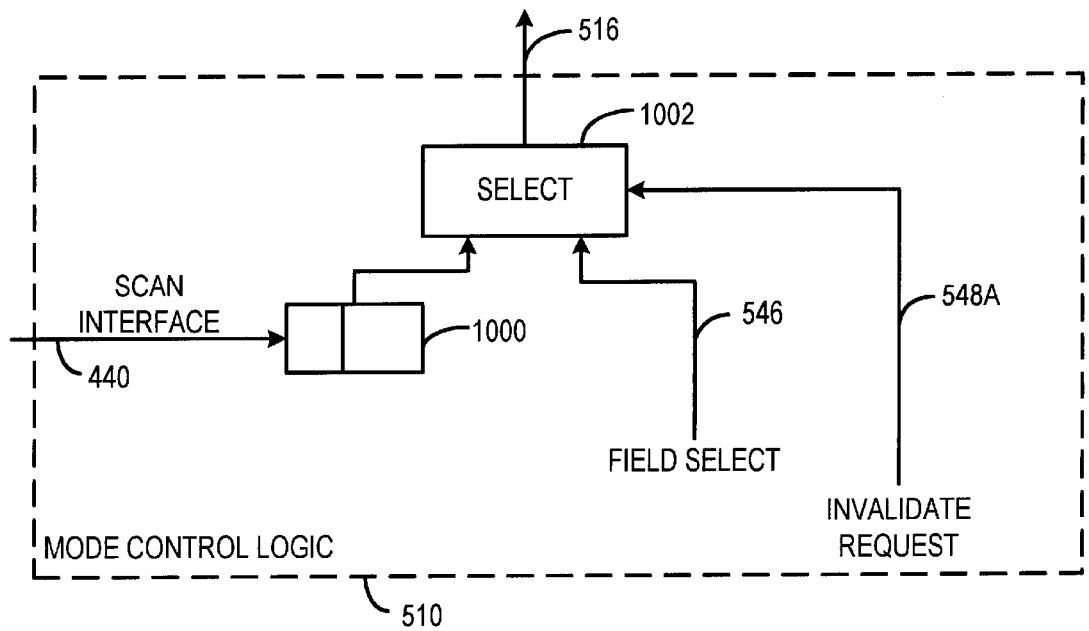
FIG. 10 is a block diagram of Mode Control Logic according to an embodiment of the invention which provides for the issuance of invalidation-type requests.

FIG. 10 is a block diagram of Mode Control Logic 510 according to an embodiment of the invention which provides for the issuance of invalidation-type requests. As mentioned above, in the most simple embodiment of the invention in which invalidation initiated by only hardware fault signals, Mode Control Logic 510 need only include a scannable storage device such as that shown as Register 1000. This register is scanned, either at initialization time or dynamically during normal system operation, to one of the encoded values shown in Column 900 of FIG. 9. However, in the embodiment of the current example and as shown in FIG. 10, an invalidation request received from TCM 320 may also be used to override the value stored in Register 1000. An override function occurs when an active Invalidate Request Signal is received by Selector 1002, causing Selector 1002 to select the Field Select Signals on Line 546 instead of selecting Signals from Register 1000. This causes bits 802 and 804 of the invalidation request received from TCM 320 to be provided to Selector 514 for use in selecting the appropriate group of CAM Compare Signals on lines 432, 434, and 436. When the Invalidate Request Signal is cleared in the manner discussed above, mode selection is again performed by the contents of Register 1000. Whereas both mode selection bits that are driven onto Line 516 are provided to Selector 514 for use in selecting the CAM Compare Signals, only the least significant bit of Register 1000 is provided to Selector 512 on Line 516A of FIG. 5. The additional selection control for Selector 512 is provided by the Invalidate Request Signal on Line 530.

Figure 11:
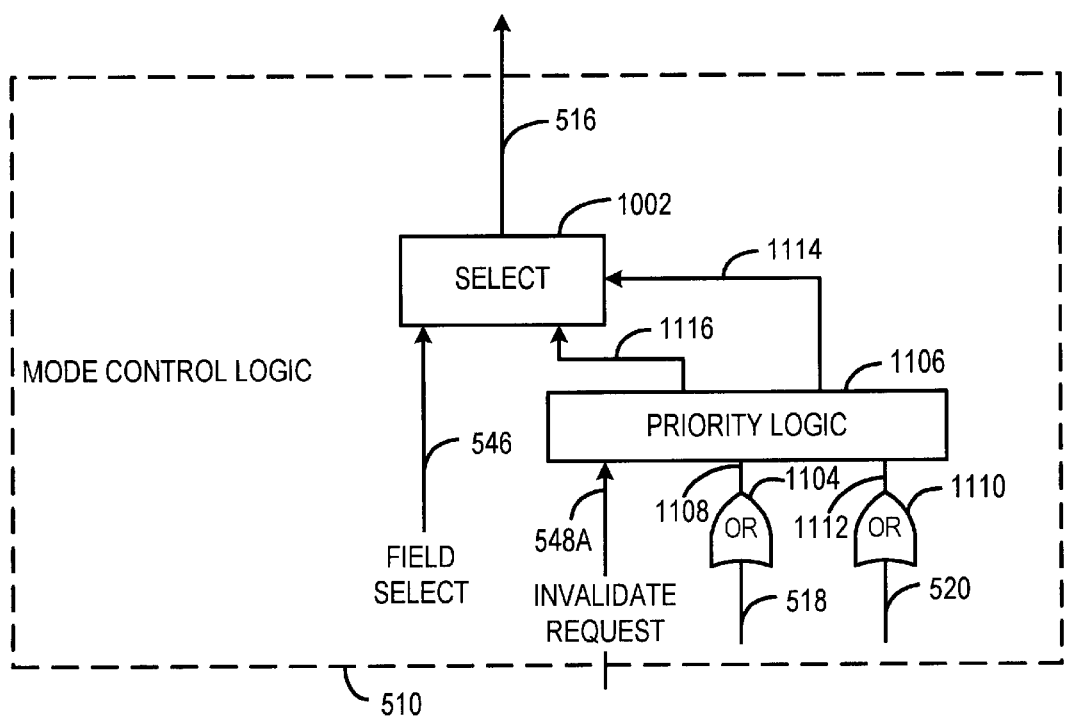
FIG. 11 is a block diagram of an alternative embodiment of Mode Control Logic in which mode control is dynamically changed by hardware to select request invalidation based on either a hardware failure, or the generation of an invalidation request.

FIG. 11 is a block diagram of an alternative embodiment of Mode Control Logic 510 in which mode control is dynamically changed by hardware to select request invalidation based on either a hardware failure, or the generation of an invalidation request. According to this embodiment, Latched MCL Error Signals are provided by MCL Error Register Logic 508 to Mode Control Logic 510 on Line 518. If any of the Latched MCL Error Signals are high-active, OR Circuit 1104 provides a MCL Error Indication to Priority Logic 1106 on Line 1108. In a similar manner, OR Circuit 1110 generates a POD Error Indication on Line 1112 to Priority Logic 1106 if any of the POD Error Signals stored in POD Error Register Logic 506 that are received on Line 520 are high-active. Priority Logic 1106 further receives the Invalidate Request Signal on Line 548A.

If any one of the signals on Lines 548A, 1208, or 1112 are high active, Priority Logic generates selection signal on Line 1114 to cause Selector 1106 to select the appropriate input on either Lines 546 or 1116. As discussed above, Line 546 provides the Field Select bits 802 and 804 from an invalidation request, which will be selected if only the Invalidate Signal on Line 548A is active, and the signals on Lines 1108 and 1112 are inactive. Otherwise, if a hardware failure occurred in either a POD or a MCL, Priority Logic 1106 generates the appropriate mode selection value on Line 1116, which is then selected using the selection signal on Line 1114. For example, if a MCL Error Signal is detected by the activation of Line 1108, Priority Logic causes mode selection on Line 1116 to be set to "01" to select Destination ID as the compare field on which to perform the invalidation operation, as is indicated by FIG. 9. Priority Logic further generates the appropriate selection signals on Line 1114 to condition selector to select this value on Line 1116. If multiple ones of Lines 548A, 1108, or 1112 are activated simultaneously, the invalidation requests are handled based on a predetermined priority scheme implemented by Priority Logic 1106.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

What is claimed is:

1. For use in a data processing system having multiple requesting units making requests to multiple receiving units wherein each of the requests includes multiple request data fields, the data processing system further including error indicators each to indicate a respective error condition occurring within the data processing system and wherein each of the error indicators is associated with an error indication value, and is further associated with a respective one of the multiple request data fields, a request invalidation system, comprising:

a storage unit to store the requests;

a programmable mode control logic to programmably select one of the multiple request data fields as an invalidation field; and a storage unit control logic coupled to said storage unit, coupled to said programmable mode control logic, and further coupled to detect the assertion of any of the error indicators, said storage unit control logic to cause the removal of any request from said storage unit that has a value stored in said selected invalidation field having a predetermined relationship to the error indication value associated with any of the asserted error indicators that are associated with said invalidation field.

2. The request invalidation system of claim 1, wherein said storage unit comprises multiple Content Addressable Memories (CAMs).

3. The request invalidation system of claim 1, wherein one of the multiple request data fields in each of the requests is a requester identity field indicating the identity of the requesting unit making the request, wherein ones of the error indicators are requester error indicators indicating a failure in a respective one of the requesting units, and wherein said storage unit control logic includes circuits to cause the removal of all requests stored in said storage unit that were made by any requesting unit indicated as failing by any of said requester error indicators if said requester identity field is selected as said invalidation field.

4. The request invalidation system of claim 1, wherein one of the multiple request data fields in each of the requests is a destination identity field indicating the identity the receiving unit that is to receive the request, wherein ones of the error indicators are receiving unit error indicators indicating a failure in a respective one of the receiving units, and wherein said storage unit control logic includes circuits to cause the removal of all requests stored in said storage unit that are made to any receiving unit indicated as failing by any of said receiving error indicators if said destination identity field is selected as said invalidation field.

5. The request invalidation system of claim 1, wherein one of the multiple request data fields in each of the requests is a job number field that stores data signals uniquely identifying a specific request, wherein ones of the error indicators are job number indicators identifying a request, and wherein said storage unit control logic includes circuits to cause the removal of any request stored in said storage unit for which said job number field stores data signals identifying a request identified by said job number indicators if said job number field is selected as said invalidation field.

6. The request invalidation system of claim 1, wherein the data processing system includes a scan interface, and wherein said programmable mode control logic includes a mode selection storage device that is programmable by the scan interface to store said invalidation field.

7. The request invalidation system of claim 6, and further including:
   invalidation request generation logic for generating invalidation requests, wherein each of said invalidation requests is one of the error indicators, and wherein each of said invalidation requests selectably indicates one of the multiple request data fields as an invalidation-request selected field; and
   wherein said programmable mode control logic includes selection circuits coupled to receive said invalidation-request selected field from said invalidation request generation logic, and to select said invalidation-request selected field as said invalidation field instead of said invalidation field stored by said mode selection storage device.

8. The request invalidation system of claim 7, wherein said invalidation request generation logic includes timer circuits for generating invalidation requests for those requests that have been pending for greater than a predetermined period of time.

9. The request invalidation system of claim 6, wherein said programmable mode control logic is further coupled to receive the error indicators, and wherein said programmable mode control logic further includes circuits to automatically override said invalidation field stored by said mode selection storage device based on the reception of error indicators not associated with said invalidation field stored by said mode selection storage device.

10. A storage device having multiple addressable locations each for storing data entries, wherein each of the data entries includes multiple fields, the memory further for receiving input compare signals to be compared against a selectable one of the multiple fields, the storage device comprising:
   multiple Content Addressable Memories, each having multiple addressable locations to store a respective one of the multiple fields for each of the data entries, wherein each of said CAMs is capable of generating a respective group of CAM compare signals to indicate whether the input compare signals has a predetermined relationship to the signals stored in any of the multiple address locations;
   a CAM compare selection circuit coupled to each of said multiple CAMs to receive each of said groups of CAM compare signals; and
   a programmable mode selection circuit coupled to said CAM compare selection circuit to cause said CAM compare selection circuit to select one of said groups of CAM compare signals from a selected one of said multiple CAMs that stores a selected one of the multiple fields based on programmable mode selection signals provided by said programmable mode selection circuit.

11. The storage device of claim 10, and further including a scan-set interface coupled to said programmable mode selection circuit to program said programmable mode selection circuit with said programmable mode selection signals.

12. The storage device of claim 10, and further including a Random Access Memory device coupled to each of said CAMs to implement selected ones of the multiple fields.

13. The storage device of claim 10, and further including control logic coupled to receive from said CAM compare selection circuit said selected one of said groups of CAM compare signals as invalidation signals, and to utilize said invalidation signals to discard ones of the data entries having signals stored in said selected one of the multiple fields that have a predetermined relationship to the input compare signals.

14. The storage device of claim 13, wherein the storage device is for use in a data processing system having one or more requesting units and one or more receiving units, wherein the memory is to store as each of the entries a respective request, each of the requests provided by one of the requesting units requesting access to a receiving unit and each request including each of the multiple fields, the data processing system further including error indicators indicative of an error associated with a respective one of the multiple fields, and further comprising an input selection circuit coupled to said programmable mode selection circuit to select one of said error indicators as the input compare signals.

15. The storage device of claim 14, wherein the data processing system further includes circuits to generate invalidation requests, each of said invalidation requests including ones of the multiple fields, wherein said invalidation request includes field select signals, and further including an invalidation request selection circuit coupled to said input selection circuit to receive each of said invalidation requests, and to select one of the multiple fields in each of said invalidation requests as the input compare signals based on said field select signals in said each of said invalidation requests.

16. The storage device of claim 15, wherein said programmable mode selection circuit includes a selection circuit to receive said field select signals from each said invalidation request, and to select said field select signals as said programmable mode selection signals.

17. The storage device of claim 14, wherein said programmable mode selection circuit includes a priority logic circuit coupled to receive the error indicators, said programmable mode selection circuit to generate said programmable mode selection signals upon the assertion of any of the error indicators, wherein said programmable mode selection signals selects said respective one of the multiple fields associated with said error indicated by said asserted error indicator.

18. For use in a data processing system having multiple requesting units requesting access to multiple receiving units, a request invalidation system, comprising:
   storage means for storing requests provided by a respective one of the multiple requesting units for gaining access to one of the multiple receiving units, wherein each of said requests includes multiple data fields;

error storage means for receiving error indicators each indicative of a fault occurring within the data processing system and each being associated with a respective one of said data fields;

mode selection means for programmably selecting one of said data fields for use as an invalidation field; and storage address means for removing from said storage means any of said stored requests for which said invalidation field has a predetermined relationship to any of said error indicators that is associated with said one of said data fields selected as said invalidation field.

19. The request invalidation system of claim 18, wherein the mode selection means includes means for detecting the assertion of any of said error indicators and for selecting as said invalidation field the data field that is associated with a selected one of said asserted error indicators.

20. The request invalidation system of claim 18, wherein ones of said error indicators are each associated with a respective one of the requesting units, and other ones of said error indicators are each associated with a respective one of the receiving units, and further including request blocking means for preventing requests received from a requesting unit associated with a previously-received error indicator, or requests to a receiving unit associated with a previously-received error indicator are blocked from being stored in said storage means.

* * * * *